(12) United States Patent
Pariante et al.

(10) Patent No.: US 8,660,945 B1
(45) Date of Patent: Feb. 25, 2014

(54) METHOD AND SYSTEM FOR IDENTIFYING SMALL BUSINESSES AND SMALL BUSINESS OPERATORS (75) Inventors: Grace Pariante, Palo Alto, CA (US); Aruna Harder, Sunnyvale, CA (US)

(73) Assignee: Intuit Inc., Mountain View, CA (US)

( * ) Notice: Subject to any disclaimer, the term of this patent is extended or adjusted under 35 U.S.C. 154(b) by 330 days.

(21) Appl. No.: 12/133,134

(22) Filed: Jun. 4, 2008

(51) Int. Cl.
*G06Q 20/04* (2012.01)
*G06Q 40/00* (2012.01)

(52) U.S. Cl.
CPC ............... *G06Q 20/04* (2013.01); *G06Q 40/00* (2013.01)
USPC .......................................................... 705/39

(58) Field of Classification Search
None
See application file for complete search history.

(56) References Cited

U.S. PATENT DOCUMENTS

| | | | | |
|---|---|---|---|---|
| 5,712,985 | A * | 1/1998 | Lee et al. ........................... | 705/7 |
| 6,009,407 | A * | 12/1999 | Garg ............................. | 705/7.25 |
| 6,414,691 | B1 * | 7/2002 | Nakagawa et al. ........... | 345/619 |
| 7,386,535 | B1 * | 6/2008 | Kalucha et al. ..................... | 1/1 |
| 7,577,579 | B2 * | 8/2009 | Watarai et al. .................. | 705/10 |
| 7,707,087 | B1 * | 4/2010 | Rogers et al. ................... | 705/35 |
| 7,769,649 | B1 * | 8/2010 | Eliscu ............................ | 705/35 |
| 2002/0040352 | A1 * | 4/2002 | McCormick .................... | 705/80 |
| 2002/0116255 | A1 * | 8/2002 | Goodwin et al. ............... | 705/11 |
| 2003/0084053 | A1 * | 5/2003 | Govrin et al. ................. | 707/100 |
| 2003/0149580 | A1 * | 8/2003 | Moores et al. ..................... | 705/1 |
| 2004/0034646 | A1 * | 2/2004 | Kimball et al. ............... | 707/102 |
| 2004/0177053 | A1 * | 9/2004 | Donoho et al. ................. | 706/47 |
| 2006/0047715 | A1 * | 3/2006 | Parizeau ....................... | 707/203 |
| 2006/0143075 | A1 * | 6/2006 | Carr et al. ...................... | 705/14 |
| 2007/0043606 | A1 * | 2/2007 | Kothari et al. ................. | 705/10 |
| 2007/0083402 | A1 * | 4/2007 | Masuyama et al. ............... | 705/7 |
| 2007/0239541 | A1 * | 10/2007 | Kane et al. ..................... | 705/14 |
| 2009/0171748 | A1 * | 7/2009 | Aven et al. ..................... | 705/10 |

OTHER PUBLICATIONS

"Jim Taylor" by Khermouch, Gerrry; Brandweek, Oct. 13, 1997 Supplement Super Brands, vol. 38 issue 38, p. 102 4p, Gateway 2000 Inc. Issn: 1064-4318.*
"Self-service technology and online financial service choice)" by Xin Ding et al.; @ www.emeraldsight.com/0956-4233.htm; Aug. 2006; 24 pages.*

* cited by examiner

*Primary Examiner* — Ella Colbert
*Assistant Examiner* — Mary Gregg
(74) *Attorney, Agent, or Firm* — Hawley Troxell Ennis & Hawley LLP; Philip McKay; Sean P. Lewis (57) ABSTRACT

A method and system for identifying small businesses and/or small business operators includes a process for identifying small businesses and/or small business operators whereby financial transaction data for one or more consumers is obtained from one or more sources. The one or more consumers' financial transaction data is then analyzed to identify financial transactions typically associated with ownership and/or management of a business, i.e., business management related transactions. If more than a threshold number of business management related transactions associated with a given consumer are identified, that consumer is identified as a potential small business owner and/or manager.

19 Claims, 2 Drawing Sheets

METHOD AND SYSTEM FOR IDENTIFYING SMALL BUSINESSES AND SMALL BUSINESS OPERATORS

BACKGROUND

Advertising and marketing represents a significant ongoing expense for most sellers of products and/or providers of goods and services. Sellers of business related products and/or services are no exception to this rule. Herein sellers of business related goods such as, but not limited to: financial institutions, such as banks, credit card and/or account providers, and other managers/providers of funds and financing; providers of business related software and/or applications; providers of general and/or specialized business products; providers of general and/or specialized business services; and/or any other sellers of business related goods and services are referred to collectively as "sellers of business products".

In order to most efficiently use their marketing and/or advertising resources, most sellers of business products are particularly interested in identifying and/or contacting/targeting consumers who are also business owners, business managers, consultants, and/or are self-employed. Herein, the term "business owners and/or managers" includes, but is not limited to, business owners, business managers, consultants, work-at-home employees, and/or self-employed parties. Traditionally, sellers of business products were typically made aware of business owners and/or managers through the business itself, i.e., the sellers of business products accessed the business owners and/or managers by contacting the business. In other cases, business owners and/or managers were identified by their maintaining traditional business banking accounts. However, with the emergence of electronic/Internet commerce, numerous small businesses have arisen that are often difficult to identify as businesses. Indeed, it is currently estimated that there are over 22 million small businesses being operated in the United States by small business owners and/or managers that do not identify themselves as small business owners and/or managers, or identify their businesses, to the banks, or other financial institutions, that manage their funds.

Many of these small business owners and/or managers fail, and/or purposely decline, to identify themselves as small business owners and/or managers because they do not consider their small businesses to be large enough to need all the additional services associated with traditional "business banking" accounts. Therefore, they do not wish to pay the additional fees associated with a traditional business banking accounts. Consequently, in many cases, these small business owners and/or managers typically use traditional "consumer" and/or "personal" checking accounts, credit lines, and/or other funding, to operate their small businesses. As a result, many small businesses, and/or small business owners and/or managers are extremely difficult to identify and many traditional methods and/or avenues, for accessing small business owners and/or managers, are often no longer available.

The situation discussed above is not only problematic for the sellers of business products, but the small business owners and/or managers are also deprived of the opportunity to receive special offers, pricing, discounts, and products that would be made available to them if they could be identified.

SUMMARY

In accordance with one embodiment, a method and system for identifying small businesses and/or small business operators includes a process for identifying small businesses and/or small business operators whereby, in one embodiment, financial transaction data for one or more consumers is obtained from one or more sources. In one embodiment, the financial transaction data for the one or more consumers is obtained, using, and/or through, and/or from, a computing system implemented financial management system. In one embodiment, the one or more consumers' financial transaction data is then analyzed to identify financial transactions typically associated with ownership and/or management of a business, i.e., business management related transactions. In one embodiment, if more than a threshold number of business management related transactions associated with a given consumer are identified, that consumer is identified as a potential small business owner and/or manager. In one embodiment, sellers of business products are then given access to the identified potential small business owners and/or managers for promoting their one or more business related products and services.

In one embodiment, access to the data representing the financial transaction data for the one or more consumers is obtained through one or more computing system implemented financial management systems that implement, include, are accessible by, and/or are otherwise associated with the process for identifying small businesses and/or small business operators. Herein, a computing system implemented financial management system can be, but is not limited to, any of the following: a computing system implemented personal financial management system; a computing system implemented home inventory system; a computing system implemented personal asset management system; a computing system implemented personal accounting system; a computing system implemented tax preparation system; and/or any of the numerous computing system implemented financial management systems, as discussed herein, and/or known to those of skill in the art at the time of filing, and/or as developed after the time of filing.

In one embodiment, a given consumer is provided the opportunity to categorize, and/or approve of the categorization of, one or more individual financial transactions. In one embodiment, the opportunity to categorize, and/or approve of the categorization, of individual financial transactions is provided through one or more computing system implemented financial management systems. In one embodiment, if the given consumer categorizes, and/or approves of the categorization of, a given individual financial transaction as a business related financial transaction, then the given individual financial transaction is considered identified as a business management related transaction. In one embodiment, if more than a threshold number of individual financial transactions associated with a given consumer are categorized as business related financial transactions by this method, and are therefore identified as business management related transactions, then the given consumer is identified as a potential small business owner and/or manager.

In one embodiment, individual financial transactions are categorized as business related financial transactions based on what category is assigned to similar financial transactions by a defined percentage of consumers in a defined community of consumers, such as all other consumers using a given computing system implemented financial management system. In one embodiment, individual financial transactions are categorized as business related financial transactions through, and/or by, one or more computing system implemented financial management systems. In one embodiment, if the given individual financial transaction is categorized as a business related financial transaction based on what category is assigned to similar financial transactions by a defined percentage of consumers in a defined community of consumers, then the given individual financial transaction is considered identified as a business management related transaction. In one embodiment, if more than a threshold number of individual financial transactions associated with a given consumer are categorized as business related financial transactions by this method, and are therefore identified as business management related transactions, then the given consumer is identified as a potential small business owner and/or manager.

In one embodiment, individual financial transactions are categorized as business related financial transactions based on the name of the payee associated with the given individual financial transaction and a comparison of that payee name with a list of payee names and assumed categorizations associated with the payee names. In one embodiment, individual financial transactions are categorized as business related financial transactions through, and/or by, one or more computing system implemented financial management systems. In one embodiment, if the given individual financial transaction is categorized as a business related financial transaction based on the name of the payee associated with the given individual financial transaction, then the given individual financial transaction is considered identified as a business management related transaction. In one embodiment, if more than a threshold number of individual financial transactions associated with a given consumer are categorized as business related financial transactions by this method, and are therefore identified as business management related transactions, then the given consumer is identified as a potential small business owner and/or manager.

In one embodiment, individual financial transactions are categorized as business related financial transactions based on a keyword, or "token" in the name of the payee associated with the given individual financial transaction and a comparison of that keyword with a list of keywords and assumed categorizations associated with the keywords. In one embodiment, individual financial transactions are categorized as business related financial transactions through, and/or by, one or more computing system implemented financial management systems. In one embodiment, if the given individual financial transaction is categorized as a business related financial transaction based on a keyword in the name of the payee associated with the given individual financial transaction, then the given individual financial transaction is considered identified as a business management related transaction. In one embodiment, if more than a threshold number of individual financial transactions associated with a given consumer are categorized as business related financial transactions by this method, and are therefore identified as business management related transactions, then the given consumer is identified as a potential small business owner and/or manager.

In one embodiment, individual financial transactions are categorized as business related financial transactions based on threshold amounts associated with a given individual financial transaction. In one embodiment, individual financial transactions are categorized as business related financial transactions through, and/or by, one or more computing system implemented financial management systems. In one embodiment, if the given individual financial transaction is categorized as a business related financial transaction based on a threshold amount associated with the given individual financial transaction, then the given individual financial transaction is considered identified as a business management related transaction. In one embodiment, if more than a threshold number of individual financial transactions associated with a given consumer are categorized as business related financial transactions by this method, and are therefore identified as business management related transactions, then the given consumer is identified as a potential small business owner and/or manager.

In one embodiment, individual financial transactions are categorized as business related financial transactions based on dates associated with a given individual financial transaction that distinguishes a personal income/expense from a business income/expense. In one embodiment, individual financial transactions are categorized as business related financial transactions through, and/or by, one or more computing system implemented financial management systems. In one embodiment, if the given individual financial transaction is categorized as a business related financial transaction based on dates associated with a given individual financial transaction, then the given individual financial transaction is considered identified as a business management related transaction. In one embodiment, if more than a threshold number of individual financial transactions associated with a given consumer are categorized as business related financial transactions by this method, and are therefore identified as business management related transactions, then the given consumer is identified as a potential small business owner and/or manager.

In one embodiment, individual financial transactions are categorized as business related financial transactions based on specific locations associated with a given individual financial transaction. In one embodiment, individual financial transactions are categorized as business related financial transactions through, and/or by, one or more computing system implemented financial management systems. In one embodiment, if the given individual financial transaction is categorized as a business related financial transaction based on specific locations associated with a given individual financial transaction, then the given individual financial transaction is considered identified as a business management related transaction. In one embodiment, if more than a threshold number of individual financial transactions associated with a given consumer are categorized as business related financial transactions by this method, and are therefore identified as business management related transactions, then the given consumer is identified as a potential small business owner and/or manager.

In one embodiment, individual financial transactions are categorized as business related financial transactions based on specific items purchased through the given individual financial transaction that distinguish a personal expense from a business expense. In one embodiment, individual financial transactions are categorized as business related financial transactions through, and/or by, one or more computing system implemented financial management systems. In one embodiment, if the given individual financial transaction is categorized as a business related financial transaction based on specific items purchased through the given individual financial transaction, then the given individual financial transaction is considered identified as a business management related transaction. In one embodiment, if more than a threshold number of individual financial transactions associated with a given consumer are categorized as business related financial transactions, and are therefore identified as business management related transactions, then the given consumer is identified as a potential small business owner and/or manager.

In one embodiment, a given consumer is identified as a potential small business owner and/or manager based on a threshold number of individual financial transactions being deposits to one or more financial institutions that take place within a given timeframe.

In one embodiment, a given consumer is identified as a potential small business owner and/or manager based on a threshold number of individual financial transactions being transfers of funds between one or more financial institutions that take place within a given timeframe.

In one embodiment, a given consumer is identified as a potential small business owner and/or manager based on a threshold number of individual financial transactions being deposits with a threshold number of different financial institutions.

In one embodiment, individual financial transactions are categorized as business related financial transactions based on any combination of the methods, criteria, and/or parameters discussed above, and/or any other methods, criteria, and/or parameters desired by the provider of the process for identifying small businesses and/or small business operators and/or one or more computing system implemented financial management systems. In one embodiment, if more than a threshold number of individual financial transactions associated with a given consumer are categorized as business related financial transactions by any of the methods, criteria, and/or parameters discussed above, and/or any combination of the methods, criteria, and/or parameters discussed above, and/or any other methods, criteria, and/or parameters, and are therefore identified as business management related transactions, then the given consumer is identified as a potential small business owner and/or manager.

In one embodiment, sellers of business products are then given access to the identified potential small business owners and/or managers by/and through the process for identifying small businesses and/or small business operators, and/or one or more computing system implemented financial management systems, for promoting their one or more products and/or services.

In one embodiment, the provider of the process for identifying small businesses and/or small business operators is the seller of products and/or the user of the process for identifying small businesses and/or small business operators. In this instance, in one embodiment, the provider of the process for identifying small businesses and/or small business operators provides the seller, or herself, advertisement space and/or access to the small business owner and/or manager, in one embodiment, on the small business owner's and/or manager's computing system, as defined herein.

In one embodiment, the provider of a computing system implemented financial management system used to obtain the consumers financial data is the seller of business products and/or the user of the process for identifying small businesses and/or small business operators. In this instance, in one embodiment, the provider of the computing system implemented financial management system used to obtain the consumers financial data provides the seller, or herself, advertisement space and/or access to the small business owner and/or manager, in one embodiment, within the consumers account in the computing system implemented financial management system and, in one embodiment, on the consumer's computing system, as defined herein, based, at least in part, on the analysis of the given consumer's financial data and the labeling of the consumer as a small business owner and/or manager by the process for identifying small businesses and/or small business operators.

Using the method and system for identifying small businesses and/or small business operators disclosed herein, a consumer's financial transaction data is used to identify small businesses and/or small business owners. One or more sellers of business products are then given access to the consumers identified as small business owners and/or managers. This is advantageous to the sellers of business products, since the small businesses and/or small business operators are identified for the sellers of business products and, in one embodiment, the sellers of business products are provided access to these desirable consumers, and to the small business owners and/or managers, since they are provided offers directly related to their status as a business manager and/or owner.

Common reference numerals are used throughout the FIG.s and the detailed description to indicate like elements. One skilled in the art will readily recognize that the above FIG.s are examples and that other architectures, modes of operation, orders of operation and elements/functions can be provided and implemented without departing from the characteristics and features of the invention, as set forth in the claims.

DETAILED DESCRIPTION

In accordance with one embodiment, a method and system for identifying small businesses and/or small business operators includes a process for identifying small businesses and/or small business operators whereby, in one embodiment, financial transaction data for one or more consumers is obtained from one or more sources. In one embodiment, the financial transaction data for the one or more consumers is obtained, using, and/or through, and/or from, a computing system implemented financial management system. In one embodiment, the one or more consumers' financial transaction data is then analyzed to identify financial transactions typically associated with ownership and/or management of a business, i.e., business management related transactions. In one embodiment, if more than a threshold number of business management related transactions associated with a given consumer are identified, that consumer is identified as a potential small business owner and/or manager. In one embodiment, sellers of business products are then given access to the identified potential small business owners and/or managers for promoting their one or more business related products and services.

Embodiments will now be discussed with reference to the accompanying FIG.s, which depict one or more exemplary embodiments. Embodiments may be embodied in many different forms and should not be construed as limited to the embodiments set forth herein, shown in the FIG.s, and/or described below. Rather, these exemplary embodiments are provided to allow a complete disclosure that conveys the principles of the invention, as set forth in the claims, to those of skill in the art.

Hardware System Architecture

FIG. 1 is a block diagram of an exemplary hardware architecture for implementing one embodiment of a system and method for identifying small businesses and/or small business operators, such as exemplary process 200 (FIG. 2) discussed herein, that, returning to FIG. 1, includes: a computing system 100, e.g., a first computing system; a computing system 150, e.g., a second computing system; a server system 120; and a database 170, all operatively coupled by a network 130.

Figure 1:
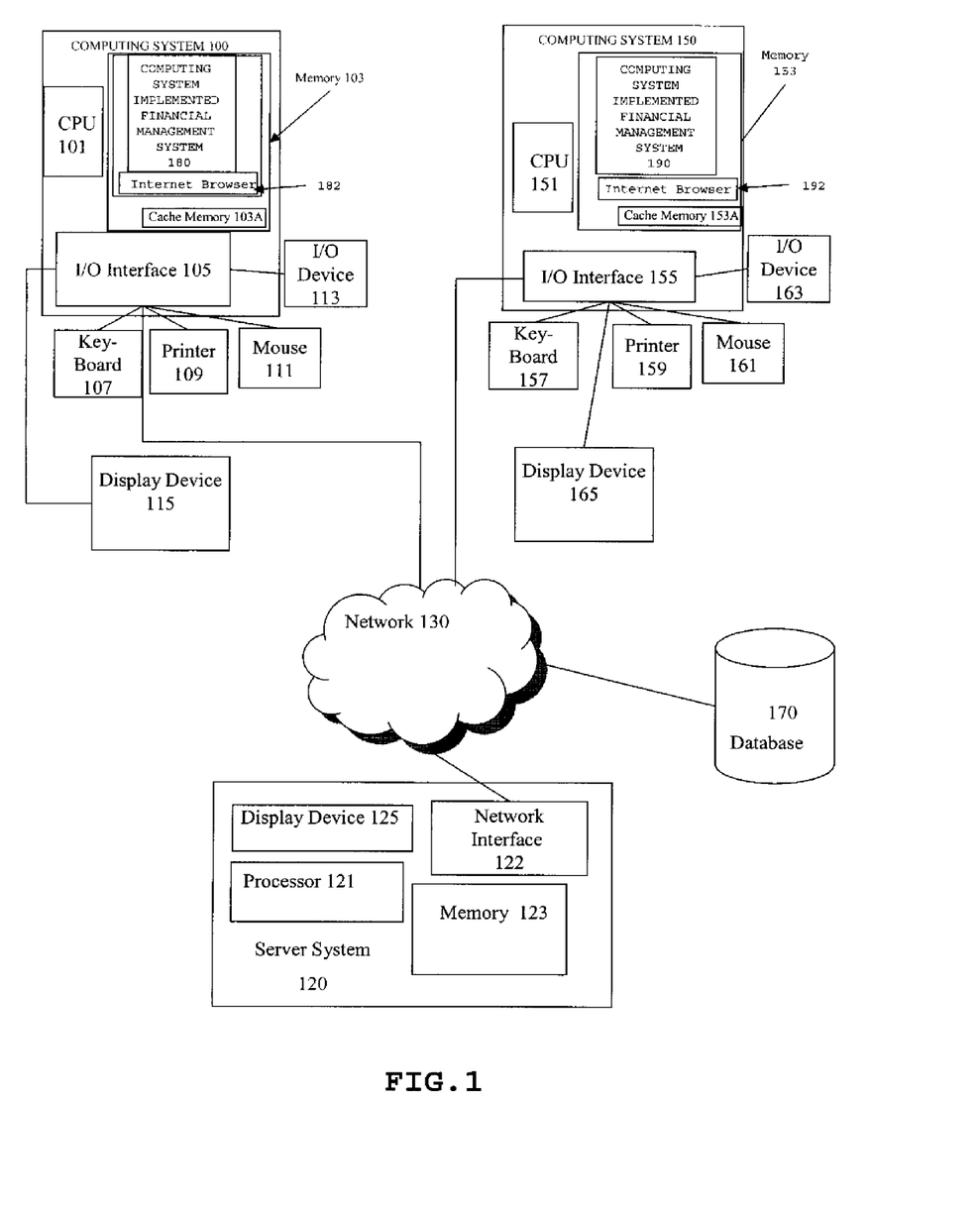
FIG. 1 is a block diagram of an exemplary hardware architecture for implementing one embodiment.

As seen in FIG. 1, computing system 100 typically includes a central processing unit (CPU) 101, an input/output (I/O) interface 105, and a memory system 103, including cache memory 103A. In one embodiment, memory system 103 includes all, or part, of a computing system implemented data management system 180 such as any computing system implemented data management system defined herein, and/or known in the art at the time of filing, and/or as developed thereafter. In one embodiment, computing system implemented data management system 180 is stored, in whole, or in part, in memory system 103, and is used by, or includes, or is accessed by, a process for identifying small businesses and/or small business operators (See FIG. 2, not shown in FIG. 1).

Returning to FIG. 1, computing system 100 may further include standard user interface devices such as a keyboard 107, a mouse 111, a printer 109, and a display device 115, as well as, one or more standard input/output (I/O) devices 113, such as a compact disk (CD) or Digital Video Disc (DVD) drive, floppy disk drive, or other digital or waveform port, or other device capable of inputting data to, and outputting data from, computing system 100, whether available or known at the time of filing or as later developed. As discussed in more detail below, in one embodiment, a process for identifying small businesses and/or small business operators and/or a computing system implemented data management system are entered, in whole, or in part, into computing system 100 via I/O device 113, such as from a CD, DVD, floppy disk, portable hard drive, memory stick, download site, or other medium and/or computer program product as defined herein.

In one embodiment, computing system 100 also includes an Internet browser capability 182 that, in one embodiment, includes a search engine (not shown) and is stored, in whole, or in part in memory 103.

In one embodiment, data representing one or more individual financial transactions (not shown) associated with one or more consumers, is stored, in whole, or in part, in memory system 103, and is used by, or is accessed by, a process for identifying small businesses and/or small business operators. In one embodiment, computing system 100 is a consumer, and/or business owner and/or manager, or other user, computing system used, and/or accessible, by another computing system, such as computing system 150 (discussed below).

Computing system 100 can be any computing system as defined herein and/or as known in the art at the time of filing and/or as developed thereafter, that includes components that can execute all, or part, of a process for identifying small businesses and/or small business operators, and/or a computing system implemented data management system, in accordance with at least one of the embodiments as described herein.

Similarly, computing system 150 typically includes a CPU 151, an input/output (I/O) interface 155, and a memory system 153, including cache memory 153A. Similar to computing system 100, computing system 150 may further include standard user interface devices such as a keyboard 157, a mouse 161, a printer 159, and a display device 165, as well as, one or more standard input/output (I/O) devices 163, such as a compact disk (CD) or DVD drive, floppy disk drive, or other digital or waveform port, or other device capable of inputting data to, and outputting data from, computing system 150, whether available or known at the time of filing or as later developed.

In one embodiment, computing system 150 also includes an Internet browser capability 192 that, in one embodiment, includes a search engine (not shown) and is stored, in whole, or in part in memory 153.

In one embodiment, memory system 153 includes all, or part, of a computing system implemented data management system 190, such as any computing system implemented data management system defined herein, and/or known in the art at the time of filing, and/or as developed thereafter. In one embodiment, computing system implemented data management system 190 is stored, in whole, or in part, in memory system 153, and is used by, or includes, or is accessed by, a process for identifying small businesses and/or small business operators.

In one embodiment, data representing one or more individual financial transactions associated with one or more consumers, is stored, in whole, or in part, in memory system 153, and is used by, or is accessed by, a process for identifying small businesses and/or small business operators. In one embodiment, computing system 150 is a computing system accessible by, and/or under the control of the provider of the process for identifying small businesses and/or small business operators and/or the process for identifying small businesses and/or small business operators. In one embodiment, computing system 150 is used, and/or accessible, by another computing system, such as computing system 100.

Computing system 150 can be any computing system as defined herein and/or as known in the art at the time of filing and/or as developed thereafter, that includes components that can execute all, or part, of a process for identifying small businesses and/or small business operators, and/or a computing system implemented data management system, in accordance with at least one of the embodiments as described herein.

As discussed in more detail below, in one embodiment, all, or part, of a process for identifying small businesses and/or small business operators, and/or a computing system implemented data management system, and/or data representing one or more individual financial transactions associated with one or more consumers, can be loaded, in whole, or in part, into computing system 150 from computing system 100 for storage in memory system 153 and/or cache memory 153A.

Also shown in FIG. 1 is database 170. In one embodiment, database 170 is a data storage device, a designated server system or computing system, or a designated portion of one or more server systems or computing systems, such as computing systems 100, 150 and server system 120, or a distributed database, or an external and/or portable hard drive. In one embodiment, database 170 is a dedicated mass storage device implemented in software, hardware, or a combination of hardware and software. In one embodiment, database 170 includes a web-based function. As discussed in more detail below, in one embodiment, database 170 is under the control of, and/or accessible by, a process for identifying small businesses and/or small business operators, and/or a computing system implemented data management system.

In one embodiment, data representing one or more individual financial transactions associated with one or more consumers, is stored, in whole, or in part, in database 170, and is used by, or is accessed by, a process for identifying small businesses and/or small business operators. In one embodiment, database 170 is used, and/or accessible, by a computing system, such as computing systems 100 and/or 150, and/or a server system, such as sever system 120 (discussed below).

In one embodiment, computing systems 100 and 150, and database 170, are coupled to a server system 120 through network 130. In one embodiment, server system 120 includes a server system display device 125, a server system processor 121, a server system memory 123, and a server system network interface 122.

In one embodiment, server system 120 is used in a station-to-station arrangement, such as a peer-to-peer, or hybrid peer-to peer, arrangement, as an indexing and/or central server used to connect a first computing system, such as computing system 100, and a second computing system, such as computing system 150.

In one embodiment, data representing one or more individual financial transactions associated with one or more consumers, is stored, in whole, or in part, in server system 120, and is used by, or is accessed by, a process for identifying small businesses and/or small business operators. In one embodiment, server system 120 is used, and/or accessible, by a computing system, such as computing systems 100 and/or 150, and/or one or more databases, such as database 170.

Network 130 can be any network or network system as defined herein, and/or known in the art at the time of filing, and/or as developed after the time of filing, capable of allowing communication between two or more computing systems, server systems, and/or databases.

Those of skill in the art will readily recognize that the components shown in FIG. 1, such as computing systems 100 and 150, database 170, server system 120, and their respective components, are shown for illustrative purposes only and that architectures with more or fewer components can implement, and benefit from, the invention. Moreover, one or more components of computing system 100, computing system 150, database 170, and server system 120 may be located remotely from their respective system and accessed via network 130. In addition, the particular type of, and configuration of, computing systems 100 and 150, database 170, and server system 120 are not relevant.

As discussed in more detail below, in one embodiment, a process for identifying small businesses and/or small business operators, and/or a computing system implemented data management system, and/or data representing one or more individual financial transactions associated with one or more consumers, is stored, in whole, or in part, in memory system 103 and/or cache memory 103A, of computing system 100, and/or memory system 153 and/or cache memory 153A of computing system 150, and/or in server memory system 123 of server system 120 and/or in database 170, and executed on computing system 100 and/or computing system 150. As used herein, a memory refers to a volatile memory, a non-volatile memory, or any combination of the two.

Although a process for identifying small businesses and/or small business operators, and/or a computing system implemented data management system, are sometimes referred to herein, alternatively, as a process, an application, a module, a program, a component of a software system, a component of a software package, a component of a parent system, a plug-in, or a feature of a parent system, this terminology is illustrative only. In some embodiments, a process for identifying small businesses and/or small business operators and/or a computing system implemented data management system are capable of being called from an application or the operating system. In one embodiment, an application, process, or program is generally defined to be any executable code. Moreover, those of skill in the art will understand that when it is said that an application, process, or an operation takes some action, the action is the result of executing one or more instructions by a processor, such as CPUs 101 and 151, or server system processor 121. In one embodiment, execution of a process by CPU 101, CPU 151, or server system processor 121, results in the operations of an agent computer process (not shown) and/or a rule computer process (not shown).

In one embodiment, a process for identifying small businesses and/or small business operators, and/or a computing system implemented data management system, and/or data representing one or more individual financial transactions associated with one or more consumers, are computer applications or processes and/or data implemented and/or run and/or stored, in full, or in part, in, or on, and/or through, a computer program product. Herein, a computer program product comprises a medium and/or I/O device configured to store or transport computer readable code, whether available or known at the time of filing or as later developed. Some examples of computer program products are CDs, DVDs, ROM cards, floppy discs, magnetic tapes, computer hard drives, portable hard drives, flash memory, volatile and non-volatile memory sticks, servers on a network, such as server system 120 of FIG. 1, and signals transmitted over a network, such as network 130 of FIG. 1, or other media or process capable of delivering computer readable data representing computer readable code, whether available or known at the time of filing or as later developed. This medium may belong to a computing system, such as computing systems 100 and 150 of FIG. 1, described above. However, in some embodiments, the medium also may be removable and/or remote from the computing system.

Process

Herein, the term "consumer", denotes any person, party, user, business, and/or entity having at least a portion of their financial transaction data obtained by a process for identifying small businesses and/or small business operators, and/or any person, party, user, business, and/or entity being analyzed and/or potentially identified by a process for identifying small businesses and/or small business operators, and/or an authorized agent of any person, party, user, business, and/or entity having at least a portion of their financial transaction data obtained by a process for identifying small businesses and/or small business operators, and/or any authorized agent of any person, party, user, business, and/or entity being analyzed and/or potentially identified by a process for identifying small businesses and/or small business operators, and/or any system and/or application acting on behalf of any person, party, user, business, and/or entity having at least a portion of their financial transaction data obtained by a process for identifying small businesses and/or small business operators, and/or any system and/or application acting on behalf of any person, party, user, business, and/or entity being analyzed and/or potentially identified by a process for identifying small businesses and/or small business operators.

Herein the term "financial institution" denotes any entity, party, person, application and/or system, such as, but not limited to, banks, credit card companies, asset account companies, and/or investment firms, that engages in money/asset/debt management and/or financial transaction management/recording and/or display.

Herein, the term "user" is used to denote any entity, party, person, consumer, application, and/or system utilizing process for identifying small businesses and/or small business operators and/or one of more computing system implemented financial management systems. As an example, herein a user can be, but is not limited to: any financial institution; an employee of a financial institution; an agent of a financial institution; an application under the control of a financial institution; a system under the control of a financial institution; a customer and/or consumer of a financial institution; a customer and/or consumer of one of more computing system implemented financial management systems; an agent of a customer and/or consumer of one of more computing system implemented financial management systems; a legal guardian of a customer and/or consumer of one of more computing system implemented financial management systems; an application under the control of a customer and/or consumer of one of more computing system implemented financial management systems; a system under the control of a customer and/or consumer of one of more computing system implemented financial management systems; a customer and/or consumer of a process for identifying small businesses and/or small business operators; an agent of a customer and/or consumer of a process for identifying small businesses and/or small business operators; a legal guardian of a customer and/or consumer of a process for identifying small businesses and/or small business operators; an application under the control of a customer and/or consumer of a process for identifying small businesses and/or small business operators; a system under the control of a customer and/or consumer of a process for identifying small businesses and/or small business operators; or any other entity, party, person, consumer, application, and/or system interacting, interfacing, providing data to and/or obtaining data from, one of more computing system implemented financial management systems and/or a process for identifying small businesses and/or small business operators.

As used herein, the terms "financial transaction", "individual financial transaction", and "transaction" are used interchangeably to denote an event whereby money and/or other goods are received, tendered, transferred, and/or exchanged and/or an income or expense is incurred. As used herein, the terms "business related financial transaction", "business financial transaction", and "business transaction" are used interchangeably to denote an event whereby money and/or other goods are received, tendered, transferred, and/or exchanged and/or an income or expense is incurred that is related to a business for accounting and/or other purposes. As used herein, the terms "personal financial transaction" and "personal transaction" are used interchangeably to denote an event whereby money and/or other goods are received, tendered, and/or exchanged and/or an income or expense is incurred that is not related to a business for accounting and/or other purposes.

As used herein, the terms "business owners and/or managers" and "small business operators" are used interchangeable and include, but are not limited to, business owners, business managers, consultants, work-at-home employees, self-employed parties, and/or any other party associated with the management and/or operation of a business and/or the offering of one or more products and/or services.

As used herein, the terms "business management related transaction" and "business management transaction" are used interchangeably to denote any financial transaction deemed to be indicative of a business and/or a business owner and/or manager.

As used herein, the term computing system, denotes, but is not limited to: a portable computer; a workstation; a two-way pager; a cellular telephone; a smart phone; a digital wireless telephone; a Personal Digital Assistant (PDA); a media player, i.e., an MP3 Player and/or other music and/or video player; a server computer; an Internet appliance; or any other device that includes components that can execute all, or part, of any one of the processes and/or operations as described herein. In addition, as used herein, the term computing system, can denote, but is not limited to, computing systems made up of multiple: computers; wireless devices; cellular telephones; digital telephones; two-way pagers; PDAs; media players; server computers; or any desired combination of these devices, that are coupled to perform the processes and/or operations as described herein.

As used herein, the term computing system implemented financial management system includes, but is not limited to: computing system implemented on-line banking systems, packages, programs, modules, or applications; computing system implemented personal and small business financial management systems, packages, programs, modules, or applications; computing system implemented business systems, packages, programs, modules, or applications; computing system implemented financial institution financial management systems, packages, programs, modules, or applications; computing system implemented tax preparation systems, packages, programs, modules, or applications; computing system implemented accounting and/or invoicing systems, packages, programs, modules, or applications; computing system implemented business and/or point of sale systems, packages, programs, modules, or applications; computing system implemented healthcare management systems, packages, programs, modules, or applications and various other electronic transaction driven data management systems, packages, programs, modules, or applications, whether known at the time of filling or as developed later.

As used herein, the term "network" is used to denote any network or network system such as, but not limited to, a peer-to-peer network, a hybrid peer-to-peer network, a Local Area Network (LAN), a Wide Area Network (WAN), a public network, such as the Internet, a private network, a cellular network, a combination of different network types, or other wireless, wired, and/or a wireless and wired combination network capable of allowing communication between two or more computing systems, whether available or known at the time of filing or as later developed.

As used herein, the term "database" is used to define any data storage mechanism known at the time of filing or as developed thereafter, such as, but not limited to: a data storage device; a designated server system or computing system, or a designated portion of one or more server systems or computing systems; a mobile computing system; a server system network; a distributed database; or an external and/or portable hard drive. Herein, the term "database" can refer to a dedicated mass storage device implemented in software, hardware, or a combination of hardware and software. Herein, the term "database" can refer to a web-based function. Herein, the term "database" can refer to data storage means that is part of, or under the control of, any computing system, as defined, known at the time of filing, or as developed thereafter.

As used herein, the term seller includes, but is not limited to: a provider of goods; a provider of services; a party desiring to access a consumer; or any other entity desiring to access a consumer.

In accordance with one embodiment, a method and system for identifying small businesses and/or small business operators includes a process for identifying small businesses and/or small business operators whereby, in one embodiment, financial transaction data for one or more consumers is obtained from one or more sources. In one embodiment, the financial transaction data for the one or more consumers is obtained, using, and/or through, and/or from, a computing system implemented financial management system. In one embodiment, the one or more consumers' financial transaction data is then analyzed to identify financial transactions typically associated with ownership and/or management of a business, i.e., business management related transactions. In one embodiment, if more than a threshold number of business management related transactions associated with a given consumer are identified, that consumer is identified as a potential small business owner and/or manager. In one embodiment, sellers of business products are then given access to the identified potential small business owners and/or managers for promoting their one or more business related products and services.

Figure 2:
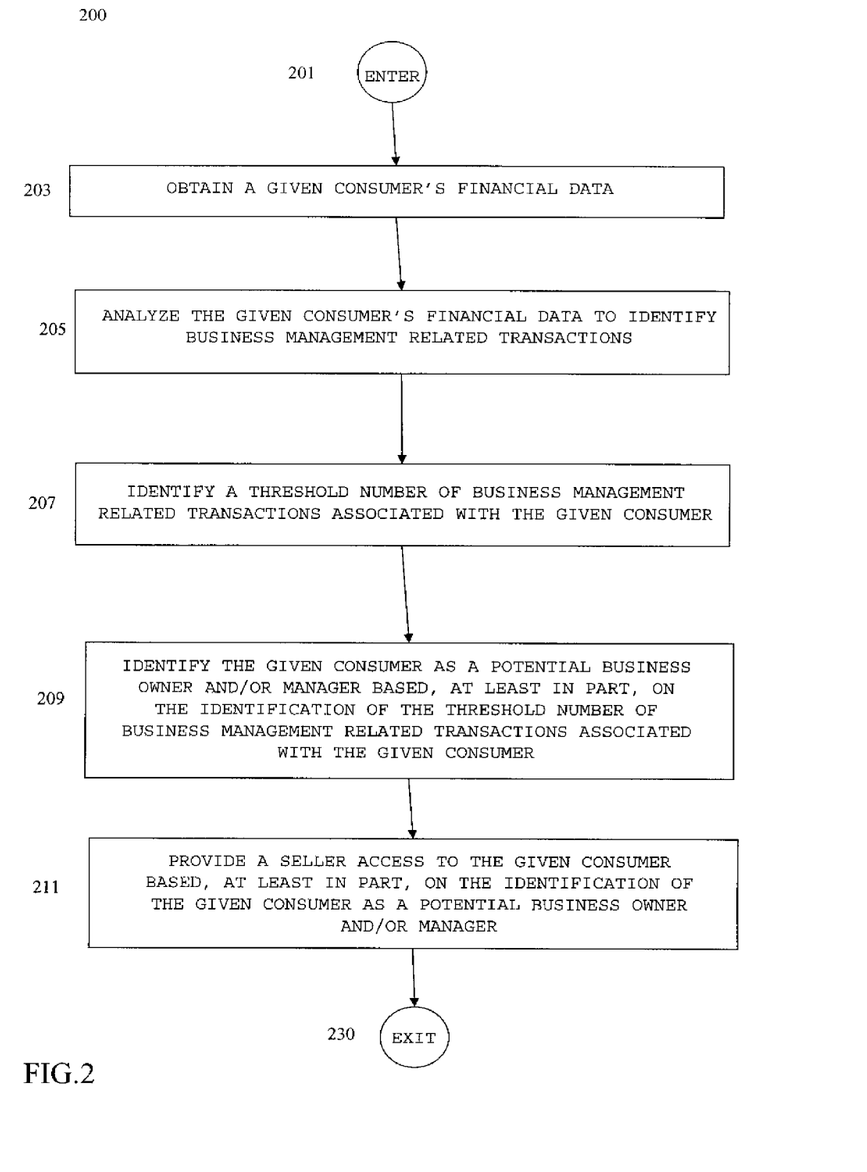
FIG. 2 is a flow chart depicting a process for identifying small businesses and/or small business operators in accordance with one embodiment.

FIG. 2 a flow chart depicting a process for identifying small businesses and/or small business operators 200 in accordance with one embodiment. Process for identifying small businesses and/or small business operators 200 begins at ENTER OPERATION 201 of FIG. 2 and process flow proceeds to OBTAIN A GIVEN CONSUMER'S FINANCIAL DATA OPERATION 203.

In one embodiment, at OBTAIN A GIVEN CONSUMER'S FINANCIAL DATA OPERATION 203 financial data representing one or more financial transactions conducted by a given consumer is obtained by process for identifying small businesses and/or small business operators 200.

In one embodiment, at OBTAIN A GIVEN CONSUMER'S FINANCIAL DATA OPERATION 203 financial data representing one or more individual financial transactions conducted by a given consumer is obtained by process for identifying small businesses and/or small business operators 200 using, and/or through, and/or from, a computing system implemented financial management system, as defined herein.

In one embodiment, the data representing individual financial transactions conducted by a given consumer obtained at OBTAIN A GIVEN CONSUMER'S FINANCIAL DATA OPERATION 203 includes data associated with individual financial transactions conducted using multiple payment methods and/or accounts to provide as complete a set of consumer financial data as possible. For instance, in one embodiment, the consumer's financial data is obtained at OBTAIN A GIVEN CONSUMER'S FINANCIAL DATA OPERATION 203 from, but not limited to, any one or more of the following sources: banks; debit cards and/or accounts; credit unions; credit cards and/or accounts and/or credit card/account providers; asset accounts and/or asset account providers; or other financial resources, accounts and/or services used by a consumer to pay for and/or conduct individual financial transactions.

In addition, in some embodiments, the consumer's financial data obtained at OBTAIN A GIVEN CONSUMER'S FINANCIAL DATA OPERATION 203 is obtained from multiple sources of the same type. For instance, in one embodiment, the given consumer's financial data is obtained at OBTAIN A GIVEN CONSUMER'S FINANCIAL DATA OPERATION 203 from: two or more banks; two or more debit cards and/or accounts; two or more credit unions; two or more credit cards and/or accounts and/or credit card/account providers; two or more asset accounts and/or asset account providers; and/or two or more other financial resources, accounts and/or services used by a consumer to pay for and/or conduct individual financial transactions.

As noted above, in one embodiment, all, or part, of the given consumer's financial data is obtained by process for identifying small businesses and/or small business operators 200 at OBTAIN A GIVEN CONSUMER'S FINANCIAL DATA OPERATION 203 from, or using, a computing system implemented financial management system, such as computing system implemented financial management systems 180 and/or 190 of FIG. 1, that implement, include, are accessed by, and/or are otherwise associated with process for identifying small businesses and/or small business operators 200 (FIG. 2).

Currently, various computing system implemented financial management systems are available including, but not limited to: computing system implemented banking systems; computing system implemented personal financial management systems; computing system implemented home inventory systems; computing system implemented tax preparation systems; computing system implemented accounting systems; and computing system implemented healthcare and/or medical expense management systems; as well as one or more other electronic data driven financial management systems.

Computing system implemented financial management systems typically help consumers/users manage their finances by providing a centralized interface with banks, credit card companies, and one or more financial institutions and/or accounts, for identifying, processing, tagging, storing, and categorizing consumer financial transactions and other consumer financial data. Currently, computing system implemented financial management systems typically obtain financial transaction information, such as payee identification, payee location, payment amount, date of the transaction, time of transaction, items purchased, the type of transaction, etc., via communication with banks, credit card providers, or other financial institutions, using electronic data transfer systems such as the Open Financial Exchange (OFX) specification, or one or more other systems for transferring financial transaction data.

As noted above, using computing system implemented financial management systems, the financial transaction information, payee identification, payee location, payment amount, date of the transaction, tags, flags, and other data is often used by the computing system implemented financial management system to categorize and/or tag and/of flag individual financial transactions as a particular type of income or expense and/or as business related expenses. Some currently offered computing system implemented financial management systems then use this financial transaction information to track events, such as purchase events, and to provide one or more historical business and/or personal data reports or displays including "to date" data reports, such as historical spending data reports, in one or more particular categories, and/or personal and/or business related tax reports.

In one embodiment, the given consumer's financial data obtained using one or more computing system implemented financial management systems is transferred, or otherwise made available to, process for identifying small businesses and/or small business operators 200 at OBTAIN A GIVEN CONSUMER'S FINANCIAL DATA OPERATION 203.

In one embodiment, all, or part, of the given consumer's financial data is obtained by process for identifying small businesses and/or small business operators 200 at OBTAIN A GIVEN CONSUMER'S FINANCIAL DATA OPERATION 203 from invoices/bills and/or receipt data provided to process for identifying small businesses and/or small business operators 200, and/or an associated computing system implemented financial management system, by one or more merchants and/or product and/or service providers. In one embodiment, the invoice/bill and/or receipt data includes "level 3" data indicating, among other things, the line item entry and product and/or service identification for each item purchased in the given individual financial transaction.

As noted above, in one embodiment, process for identifying small businesses and/or small business operators 200 is associated with a computing system implemented financial management system, such as computing system implemented financial management systems 180 and/or 190 of FIG. 1, that implements, includes, is accessed by, and/or is otherwise associated with, process for identifying small businesses and/or small business operators 200 (FIG. 2). Some of these computing system implemented financial management systems provide the capability to obtain, receive, and/or process electronic copies of the invoices/receipts from one or more merchants and/or product and/or service providers, often in their specific formats, and then store the data for use by process for identifying small businesses and/or small business operators 200 in one of numerous locations by one of numerous methods known to those of skill in the art and/or as discussed herein.

In one embodiment, all, or part, of the given consumer's financial data is obtained by process for identifying small businesses and/or small business operators 200, and/or a computing system implemented financial management system, at OBTAIN A GIVEN CONSUMER'S FINANCIAL DATA OPERATION 203 from one or more of the following, either directly, or by using screen scraping technology, or a similar technology: websites sponsored by, controlled by, or associated with banks, debit cards and/or accounts, credit unions, credit cards and/or accounts, and/or credit card/account providers, asset accounts and/or asset account providers, or other financial resources, accounts and/or services used by a consumer to pay for and/or conduct individual financial transactions; and/or computing system implemented applications sponsored by, controlled by, or associated with banks, debit cards and/or accounts, credit unions, credit cards and/or accounts, and/or credit card/account providers, asset accounts and/or asset account providers, or other financial resources, accounts and/or services used by a consumer to pay for and/or conduct individual financial transactions.

In one embodiment, all, or part, of the given consumer's financial data is obtained by process for identifying small businesses and/or small business operators 200 at OBTAIN A GIVEN CONSUMER'S FINANCIAL DATA OPERATION 203 from user input through a user interface display on a computing system display, such as display devices 115 and/or 165 of computing systems 100 and/or 150 of FIG. 1, using a user interface device such as keyboard 107, 157, mouse 111, 161 of FIG. 1 or a touchpad, voice command recognition system, or any other device capable of providing user input to a computing system or for translating user actions into computing system operations, whether available or known at the time of filing or as developed later.

Returning to FIG. 2, in one embodiment, all, or part, of the given consumer's financial data is obtained by process for identifying small businesses and/or small business operators 200 at OBTAIN A GIVEN CONSUMER'S FINANCIAL DATA OPERATION 203 from any combination of the above sources and/or from any other source of a consumer's financial data as discussed herein, and/or known at the time of filing, and/or as developed thereafter.

In one embodiment, once the given consumer's financial data is obtained at OBTAIN A GIVEN CONSUMER'S FINANCIAL DATA OPERATION 203, the data is stored in whole, or in part, in a database maintained by, accessible by, owned by, or otherwise related to: process for identifying small businesses and/or small business operators 200, and/or a provider of process for identifying small businesses and/or small business operators 200; a computing system implemented financial management system, and/or a provider of a computing system implemented financial management system; one or more sellers of business products; or any other party, by any one of the numerous mechanisms known to those of skill in the art. For instance, in one embodiment, the data, in whole, or in part, is stored in a memory system, such as memory systems 103 and 153 or server memory system 123, or database 170, of FIG. 1, or in a cache memory, such as cache memories 103A/153A of FIG. 1, or in any main memory or mass memory, associated with a computing system, such as computing systems 100 or 150 described above. In one embodiment, the data, in whole, or in part, is stored in any computing system and/or server system, such as computing systems 100 or 150 or server system 120, or other device, in another location, or on/in a computer readable medium, and/or any other computer program product, as defined herein. In one embodiment, the data, in whole, or in part, is stored on a webpage, in a web-based system or on a public network such as the Internet.

Returning to FIG. 2, in some embodiments, the given consumer's financial data stored as described above is maintained, in whole, or in part, by: process for identifying small businesses and/or small business operators 200, and/or a provider of process for identifying small businesses and/or small business operators 200; a computing system implemented financial management system, and/or a provider of a computing system implemented financial management system; a third party data storage institution; any third party service or institution; or any other parties. In some of these embodiments, access to the given consumer's financial data is then provided to process for identifying small businesses and/or small business operators 200, and/or a computing system implemented financial management system, by providing access to the data and/or providing the data on a computer program product.

In one embodiment, once financial data representing one or more financial transactions conducted by a given consumer is obtained by process for identifying small businesses and/or small business operators 200 at OBTAIN A GIVEN CONSUMER'S FINANCIAL DATA OPERATION 203, process flow proceeds to ANALYZE THE GIVEN CONSUMER'S FINANCIAL DATA TO IDENTIFY BUSINESS MANAGEMENT RELATED TRANSACTIONS OPERATION 205.

In one embodiment, at ANALYZE THE GIVEN CONSUMER'S FINANCIAL DATA TO IDENTIFY BUSINESS MANAGEMENT RELATED TRANSACTIONS OPERATION 205 the given consumer's financial data obtained at OBTAIN A GIVEN CONSUMER'S FINANCIAL DATA OPERATION 203 is analyzed to identify financial transactions typically associated with ownership and/or management of a business, i.e., business management related transactions.

As discussed above, using computing system implemented financial management systems, the financial transaction data, payee identification, payee location, payment amount, date of the transaction, tags, flags, and other data is often used by the computing system implemented financial management system to categorize and/or tag and/of flag individual financial transactions as a particular type of income or expense and, in particular, in some cases as business related expenses or income. In these instances at ANALYZE THE GIVEN CONSUMER'S FINANCIAL DATA TO IDENTIFY BUSINESS MANAGEMENT RELATED TRANSACTIONS OPERATION 205 the given consumer's financial data obtained at OBTAIN A GIVEN CONSUMER'S FINANCIAL DATA OPERATION 203 is analyzed and transactions categorized flagged, and/or tagged by, or through, the computing system implemented financial management system, as business income and/or expenses are identified by process for identifying small businesses and/or small business operators 200 as business management related transactions.

For instance, in one embodiment, the given consumer categorizes, and/or approves of the categorization of, one or more individual financial transactions. In one embodiment, the opportunity to categorize, and/or approve of the categorization, of individual financial transactions is provided through one or more computing system implemented financial management systems.

In one embodiment, if the given consumer categorizes, and/or approves of the categorization of, a given individual financial transaction as a business related financial transaction, then at ANALYZE THE GIVEN CONSUMER'S FINANCIAL DATA TO IDENTIFY BUSINESS MANAGEMENT RELATED TRANSACTIONS OPERATION 205 the given individual financial transaction is considered identified as a business management related transaction. As a specific example, individual financial transactions tagged and/or categorized by the given consumer directly, or through a computing system implemented financial management system, as business tax expenses and/or credits, such as a schedule C or schedule K tax line identified items, would be identified as business management related transactions at ANALYZE THE GIVEN CONSUMER'S FINANCIAL DATA TO IDENTIFY BUSINESS MANAGEMENT RELATED TRANSACTIONS OPERATION 205. As another specific illustrative example, any individual financial transactions identified by any party and/or means as business tax expenses and/or credits, such as a schedule C or schedule K tax line items, and then approved by the given consumer, would be identified as business management related transactions at ANALYZE THE GIVEN CONSUMER'S FINANCIAL DATA TO IDENTIFY BUSINESS MANAGEMENT RELATED TRANSACTIONS OPERATION 205.

As discussed below, in one embodiment, if more than a threshold number of individual financial transactions associated with a given consumer are categorized as business related financial transactions, and are therefore identified as business management related transactions at ANALYZE THE GIVEN CONSUMER'S FINANCIAL DATA TO IDENTIFY BUSINESS MANAGEMENT RELATED TRANSACTIONS OPERATION 205, then the given consumer is identified as a potential small business owner and/or manager.

In one embodiment, individual financial transactions are categorized as business related financial transactions based on what category is assigned to similar financial transactions by a defined percentage of consumers in a defined community of consumers, such as all other consumers using a given computing system implemented financial management system. In one embodiment, individual financial transactions are categorized as business related financial transactions through, and/or by, one or more computing system implemented financial management systems.

In one embodiment, if the given individual financial transaction is categorized as a business related financial transaction based on what category is assigned to similar financial transactions by a defined percentage of consumers in a defined community of consumers, then at ANALYZE THE GIVEN CONSUMER'S FINANCIAL DATA TO IDENTIFY BUSINESS MANAGEMENT RELATED TRANSACTIONS OPERATION 205 the given individual financial transaction is considered identified as a business management related transaction. As a specific illustrative example, assume the defined community is all users of a given computing system implemented financial management system. Further assume that 51% of all users of the given computing system implemented financial management system categorize financial transactions having a payee of "business tax service Co." as a business related financial transaction 51% of the time. Then if a given individual financial transaction has the payee "business tax service Co.", at ANALYZE THE GIVEN CONSUMER'S FINANCIAL DATA TO IDENTIFY BUSINESS MANAGEMENT RELATED TRANSACTIONS OPERATION 205, the given individual financial transaction is considered identified as a business management related transaction.

As discussed below, in one embodiment, if more than a threshold number of individual financial transactions associated with a given consumer are categorized as business related financial transactions by the method discussed above, and are therefore identified as business management related transactions at ANALYZE THE GIVEN CONSUMER'S FINANCIAL DATA TO IDENTIFY BUSINESS MANAGEMENT RELATED TRANSACTIONS OPERATION 205, then the given consumer is identified as a potential small business owner and/or manager.

In one embodiment, individual financial transactions are categorized as business related financial transactions based on the name of the payee associated with the given individual financial transaction and a comparison of that payee name with a list of payee names and assumed categorizations associated with the payee names. In one embodiment, individual financial transactions are categorized as business related financial transactions through, and/or by, one or more computing system implemented financial management systems.

In one embodiment, if the given individual financial transaction is categorized as a business related financial transaction based on the name of the payee associated with the given individual financial transaction, then at ANALYZE THE GIVEN CONSUMER'S FINANCIAL DATA TO IDENTIFY BUSINESS MANAGEMENT RELATED TRANSACTIONS OPERATION 205, the given individual financial transaction is considered identified as a business management related transaction. As a specific illustrative example, a payee such as a business licensing agency or business association could indicate that the given individual financial transaction is a business management related transaction. As another example, a payment to a wholesale distributor payee could indicate that the given individual financial transaction is a business management related transaction. As yet another example, a large payment amount to supplier, or an Internet based auction site, could also indicate that the given individual financial transaction is a business management related transaction.

As discussed below, in one embodiment, if more than a threshold number of individual financial transactions associated with a given consumer are categorized as business related financial transactions by the method discussed above, and are therefore identified as business management related transactions at ANALYZE THE GIVEN CONSUMER'S FINANCIAL DATA TO IDENTIFY BUSINESS MANAGEMENT RELATED TRANSACTIONS OPERATION 205, then the given consumer is identified as a potential small business owner and/or manager.

In one embodiment, individual financial transactions are categorized as business related financial transactions based on a keyword, or "token" in the name of the payee associated with the given individual financial transaction and a comparison of that keyword with a list of keywords and assumed categorizations associated with the keywords. In one embodiment, individual financial transactions are categorized as business related financial transactions through, and/or by, one or more computing system implemented financial management systems.

In one embodiment, if the given individual financial transaction is categorized as a business related financial transaction based on a keyword in the name of the payee associated with the given individual financial transaction, then at ANALYZE THE GIVEN CONSUMER'S FINANCIAL DATA TO IDENTIFY BUSINESS MANAGEMENT RELATED TRANSACTIONS OPERATION 205, the given individual financial transaction is considered identified as a business management related transaction. As a specific illustrative example, a lookup table associates all payees having the word "business" in their name as business related payees. Consequently, if the payee associated with a given individual financial transaction is "business tax service Co.", then at ANALYZE THE GIVEN CONSUMER'S FINANCIAL DATA TO IDENTIFY BUSINESS MANAGEMENT RELATED TRANSACTIONS OPERATION 205, the given individual financial transaction is considered identified as a business management related transaction.

As discussed below, in one embodiment, if more than a threshold number of individual financial transactions associated with a given consumer are categorized as business related financial transactions by the method discussed above, and are therefore identified as business management related transactions at ANALYZE THE GIVEN CONSUMER'S FINANCIAL DATA TO IDENTIFY BUSINESS MANAGEMENT RELATED TRANSACTIONS OPERATION 205, then the given consumer is identified as a potential small business owner and/or manager.

In one embodiment, individual financial transactions are categorized as business related financial transactions ANALYZE THE GIVEN CONSUMER'S FINANCIAL DATA TO IDENTIFY BUSINESS MANAGEMENT RELATED TRANSACTIONS OPERATION 205 based on threshold amounts associated with the given individual financial transaction. In one embodiment, individual financial transactions are categorized as business related financial transactions through, and/or by, one or more computing system implemented financial management systems.

In one embodiment, if the given individual financial transaction is categorized as a business related financial transaction based on a threshold amount associated with the given individual financial transaction, then at ANALYZE THE GIVEN CONSUMER'S FINANCIAL DATA TO IDENTIFY BUSINESS MANAGEMENT RELATED TRANSACTIONS OPERATION 205, the given individual financial transaction is considered identified as a business management related transaction.

As discussed below, in one embodiment, if more than a threshold number of individual financial transactions associated with a given consumer are categorized as business related financial transactions by the method discussed above, and are therefore identified as business management related transactions at ANALYZE THE GIVEN CONSUMER'S FINANCIAL DATA TO IDENTIFY BUSINESS MANAGEMENT RELATED TRANSACTIONS OPERATION 205, then the given consumer is identified as a potential small business owner and/or manager.

In one embodiment, individual financial transactions are categorized as business related financial transactions based on dates associated with a given individual financial transaction that distinguishes a personal income/expense from a business income/expense. In one embodiment, individual financial transactions are categorized as business related financial transactions through, and/or by, one or more computing system implemented financial management systems.

In one embodiment, if the given individual financial transaction is categorized as a business related financial transaction based on dates associated with a given individual financial transaction, then at ANALYZE THE GIVEN CONSUMER'S FINANCIAL DATA TO IDENTIFY BUSINESS MANAGEMENT RELATED TRANSACTIONS OPERATION 205, the given individual financial transaction is considered identified as a business management related transaction.

As discussed below, in one embodiment, if more than a threshold number of individual financial transactions associated with a given consumer are categorized as business related financial transactions by the method discussed above, and are therefore identified as business management related transactions at ANALYZE THE GIVEN CONSUMER'S FINANCIAL DATA TO IDENTIFY BUSINESS MANAGEMENT RELATED TRANSACTIONS OPERATION 205, then the given consumer is identified as a potential small business owner and/or manager.

In one embodiment, individual financial transactions are categorized as business related financial transactions based on specific locations associated with a given individual financial transaction. In one embodiment, individual financial transactions are categorized as business related financial transactions through, and/or by, one or more computing system implemented financial management systems.

In one embodiment, if the given individual financial transaction is categorized as a business related financial transaction based on specific locations associated with a given individual financial transaction, then at ANALYZE THE GIVEN CONSUMER'S FINANCIAL DATA TO IDENTIFY BUSINESS MANAGEMENT RELATED TRANSACTIONS OPERATION 205, the given individual financial transaction is considered identified as a business management related transaction.

As discussed below, in one embodiment, if more than a threshold number of individual financial transactions associated with a given consumer are categorized as business related financial transactions by the method discussed above, and are therefore identified as business management related transactions at ANALYZE THE GIVEN CONSUMER'S FINANCIAL DATA TO IDENTIFY BUSINESS MANAGEMENT RELATED TRANSACTIONS OPERATION 205, then the given consumer is identified as a potential small business owner and/or manager.

In one embodiment, individual financial transactions are categorized as business related financial transactions based on specific items purchased through the given individual financial transaction that distinguish a personal expense from a business expense. In one embodiment, individual financial transactions are categorized as business related financial transactions through, and/or by, one or more computing system implemented financial management systems.

In one embodiment, if the given individual financial transaction is categorized as a business related financial transaction based on specific items purchased through the given individual financial transaction, then at ANALYZE THE GIVEN CONSUMER'S FINANCIAL DATA TO IDENTIFY BUSINESS MANAGEMENT RELATED TRANSACTIONS OPERATION 205, the given individual financial transaction is considered identified as a business management related transaction.

As discussed below, in one embodiment, if more than a threshold number of individual financial transactions associated with a given consumer are categorized as business related financial transactions by the method discussed above, and are therefore identified as business management related transactions at ANALYZE THE GIVEN CONSUMER'S FINANCIAL DATA TO IDENTIFY BUSINESS MANAGEMENT RELATED TRANSACTIONS OPERATION 205, then the given consumer is identified as a potential small business owner and/or manager.

In one embodiment, two or more given individual financial transactions are identified as business management related transactions at ANALYZE THE GIVEN CONSUMER'S FINANCIAL DATA TO IDENTIFY BUSINESS MANAGEMENT RELATED TRANSACTIONS OPERATION 205 based on the two or more given individual financial transactions being two or more of a threshold number of individual financial transactions that represent deposits to one or more financial institutions that take place within a given timeframe.

As discussed below, in one embodiment, if more than a threshold number of individual financial transactions associated with a given consumer are categorized as business related financial transactions by the method discussed above, and are therefore identified as business management related transactions at ANALYZE THE GIVEN CONSUMER'S FINANCIAL DATA TO IDENTIFY BUSINESS MANAGEMENT RELATED TRANSACTIONS OPERATION 205, then the given consumer is identified as a potential small business owner and/or manager.

In one embodiment, two or more given individual financial transactions are identified as business management related transactions at ANALYZE THE GIVEN CONSUMER'S FINANCIAL DATA TO IDENTIFY BUSINESS MANAGEMENT RELATED TRANSACTIONS OPERATION 205 based on the two or more given individual financial transactions being deposits with a threshold number of different financial institutions.

As discussed below, in one embodiment, if more than a threshold number of individual financial transactions associated with a given consumer are categorized as business related financial transactions by the method discussed above, and are therefore identified as business management related transactions at ANALYZE THE GIVEN CONSUMER'S FINANCIAL DATA TO IDENTIFY BUSINESS MANAGEMENT RELATED TRANSACTIONS OPERATION 205, then the given consumer is identified as a potential small business owner and/or manager.

In one embodiment, individual financial transactions are categorized as business related financial transactions based on any combination of the methods, criteria, and/or parameters discussed above, and/or any other methods, criteria, and/or parameters desired by the provider of the process for identifying small businesses and/or small business operators and/or one or more computing system implemented financial management systems.

In one embodiment, if more than a threshold number of individual financial transactions associated with a given consumer are categorized as business related financial transactions by any of the methods, criteria, and/or parameters discussed above, and/or any combination of the methods, criteria, and/or parameters discussed above, and/or any other methods, criteria, and/or parameters, and are therefore identified as business management related transactions at ANALYZE THE GIVEN CONSUMER'S FINANCIAL DATA TO IDENTIFY BUSINESS MANAGEMENT RELATED TRANSACTIONS OPERATION 205, then, as discussed below, the given consumer is identified as a potential small business owner and/or manager.

The specific analysis, methods, criteria, parameters, and examples discussed above are but a few specific examples of possible ways that at ANALYZE THE GIVEN CONSUMER'S FINANCIAL DATA TO IDENTIFY BUSINESS MANAGEMENT RELATED TRANSACTIONS OPERATION 205 the consumers' financial data obtained at OBTAIN A GIVEN CONSUMER'S FINANCIAL DATA OPERATION 203 is analyzed to identify business management related transactions. Therefore, the specific examples discussed above are illustrative only and do not limit the invention as claimed below.

In one embodiment, once the given consumer's financial data of OBTAIN A GIVEN CONSUMER'S FINANCIAL DATA OPERATION 203 is analyzed to identify financial transactions typically associated with ownership and/or management of a business, i.e., business management related transactions, at ANALYZE THE GIVEN CONSUMER'S FINANCIAL DATA TO IDENTIFY BUSINESS MANAGEMENT RELATED TRANSACTIONS OPERATION 205 process flow proceeds to IDENTIFY A THRESHOLD NUMBER OF BUSINESS MANAGEMENT RELATED TRANSACTIONS ASSOCIATED WITH THE GIVEN CONSUMER OPERATION 207.

In one embodiment, at IDENTIFY A THRESHOLD NUMBER OF BUSINESS MANAGEMENT RELATED TRANSACTIONS ASSOCIATED WITH THE GIVEN CONSUMER OPERATION 207 a threshold number of business management related transactions necessary to identify a given consumer as a potential small business owner and/or manager is defined. Then, in one embodiment, at IDENTIFY A THRESHOLD NUMBER OF BUSINESS MANAGEMENT RELATED TRANSACTIONS ASSOCIATED WITH THE GIVEN CONSUMER OPERATION 207 at least the defined threshold number of individual financial transactions associated with a given consumer are categorized as business related financial transactions by any of the methods, criteria, and/or parameters discussed above, and/or any combination of the methods, criteria, and/or parameters discussed above, and/or any other methods, criteria, and/or parameters, and are therefore identified as business management related transactions at ANALYZE THE GIVEN CONSUMER'S FINANCIAL DATA TO IDENTIFY BUSINESS MANAGEMENT RELATED TRANSACTIONS OPERATION 205.

In one embodiment, at IDENTIFY A THRESHOLD NUMBER OF BUSINESS MANAGEMENT RELATED TRANSACTIONS ASSOCIATED WITH THE GIVEN CONSUMER OPERATION 207 a threshold number of business management related transactions necessary to identify a given consumer as a potential small business owner and/or manager is defined as one or more business management related transactions. In other embodiments, a greater number of business management related transactions is defined as the threshold number.

As discussed below, in one embodiment, if more than the defined threshold number of business management related transactions associated with a given consumer of ANALYZE THE GIVEN CONSUMER'S FINANCIAL DATA TO IDENTIFY BUSINESS MANAGEMENT RELATED TRANSACTIONS OPERATION 205 are identified at IDENTIFY A THRESHOLD NUMBER OF BUSINESS MANAGEMENT RELATED TRANSACTIONS ASSOCIATED WITH THE GIVEN CONSUMER OPERATION 207, that consumer is identified by process for identifying small businesses and/or small business operators 200 as a potential small business owner and/or manager.

In one embodiment, once a threshold number of business management related transactions is defined and the defined threshold number of business management related transactions associated with a given consumer are identified at IDENTIFY A THRESHOLD NUMBER OF BUSINESS MANAGEMENT RELATED TRANSACTIONS ASSOCIATED WITH THE GIVEN CONSUMER OPERATION 207, process flow proceeds to IDENTIFY THE GIVEN CONSUMER AS A POTENTIAL BUSINESS OWNER AND/OR MANAGER BASED, AT LEAST IN PART, ON THE IDENTIFICATION OF THE THRESHOLD NUMBER OF BUSINESS MANAGEMENT RELATED TRANSACTIONS ASSOCIATED WITH THE GIVEN CONSUMER OPERATION 209.

In one embodiment, at IDENTIFY THE GIVEN CONSUMER AS A POTENTIAL BUSINESS OWNER AND/OR MANAGER BASED, AT LEAST IN PART, ON THE IDENTIFICATION OF THE THRESHOLD NUMBER OF BUSI- NESS MANAGEMENT RELATED TRANSACTIONS ASSOCIATED WITH THE GIVEN CONSUMER OPERATION 209, based on the findings at IDENTIFY A THRESHOLD NUMBER OF BUSINESS MANAGEMENT RELATED TRANSACTIONS ASSOCIATED WITH THE GIVEN CONSUMER OPERATION 207, the given consumer of OBTAIN A GIVEN CONSUMER'S FINANCIAL DATA OPERATION 203 is identified/categorized by process for identifying small businesses and/or small business operators 200 as a potential small business owner and/or manager.

In one embodiment, the identification/categorization of the given consumer as a small business owner and/or manager is determined to mean that the consumer is likely to own, operate, and/or be associated with the management of a business. Consequently, the consumer identified/categorized at IDENTIFY THE GIVEN CONSUMER AS A POTENTIAL BUSINESS OWNER AND/OR MANAGER BASED, AT LEAST IN PART, ON THE IDENTIFICATION OF THE THRESHOLD NUMBER OF BUSINESS MANAGEMENT RELATED TRANSACTIONS ASSOCIATED WITH THE GIVEN CONSUMER OPERATION 209 as a small business owner and/or manager is determined to be a good candidate to receive offers, discounts and advertisements directed to various products and/or services.

In one embodiment, once the consumer is identified/categorized as a small business owner and/or manager at IDENTIFY THE GIVEN CONSUMER AS A POTENTIAL BUSINESS OWNER AND/OR MANAGER BASED, AT LEAST IN PART, ON THE IDENTIFICATION OF THE THRESHOLD NUMBER OF BUSINESS MANAGEMENT RELATED TRANSACTIONS ASSOCIATED WITH THE GIVEN CONSUMER OPERATION 209, process flow proceeds to PROVIDE A SELLER ACCESS TO THE GIVEN CONSUMER BASED, AT LEAST IN PART, ON THE IDENTIFICATION OF THE GIVEN CONSUMER AS A POTENTIAL BUSINESS OWNER AND/OR MANAGER OPERATION 211.

In one embodiment, at PROVIDE A SELLER ACCESS TO THE GIVEN CONSUMER BASED, AT LEAST IN PART, ON THE IDENTIFICATION OF THE GIVEN CONSUMER AS A POTENTIAL BUSINESS OWNER AND/OR MANAGER OPERATION 211, one or more sellers of business products are provided access to the given consumer of IDENTIFY THE GIVEN CONSUMER AS A POTENTIAL BUSINESS OWNER AND/OR MANAGER BASED, AT LEAST IN PART, ON THE IDENTIFICATION OF THE THRESHOLD NUMBER OF BUSINESS MANAGEMENT RELATED TRANSACTIONS ASSOCIATED WITH THE GIVEN CONSUMER OPERATION 209.

In one embodiment, at PROVIDE A SELLER ACCESS TO THE GIVEN CONSUMER BASED, AT LEAST IN PART, ON THE IDENTIFICATION OF THE GIVEN CONSUMER AS A POTENTIAL BUSINESS OWNER AND/OR MANAGER OPERATION 211, one or more sellers of business products are provided access to the consumer of IDENTIFY THE GIVEN CONSUMER AS A POTENTIAL BUSINESS OWNER AND/OR MANAGER BASED, AT LEAST IN PART, ON THE IDENTIFICATION OF THE THRESHOLD NUMBER OF BUSINESS MANAGEMENT RELATED TRANSACTIONS ASSOCIATED WITH THE GIVEN CONSUMER OPERATION 209 by providing the seller advertisement avenues and/or advertising space.

Traditionally, advertising has been done through printed media, visual media, television, radio, etc. In these instances, using process for identifying small businesses and/or small business operators 200, at PROVIDE A SELLER ACCESS TO THE GIVEN CONSUMER BASED, AT LEAST IN PART, ON THE IDENTIFICATION OF THE GIVEN CONSUMER AS A POTENTIAL BUSINESS OWNER AND/OR MANAGER OPERATION 211 the seller is provided and/or charged for access to one or more consumers based, at least in part, on the categorization of the consumer as a small business owner and/or manager at IDENTIFY THE GIVEN CONSUMER AS A POTENTIAL BUSINESS OWNER AND/OR MANAGER BASED, AT LEAST IN PART, ON THE IDENTIFICATION OF THE THRESHOLD NUMBER OF BUSINESS MANAGEMENT RELATED TRANSACTIONS ASSOCIATED WITH THE GIVEN CONSUMER OPERATION 209.

With the advent of the Internet and electronic commerce, several new avenues for accessing consumers have also been opened, including general and content-based advertising, typically on websites, computing system applications, and Internet search engines. Currently, some providers of computing system implemented applications, search engines, and/or websites offer sellers of business products of consumer goods and services the opportunity to place advertisements at strategic locations within the applications and/or websites.

In some cases, these advertisements appear based on content and/or other criteria. In addition, in some instances, sellers of business products of consumer goods and services are charged based on the number of potential customers that view the sellers of business products advertise and/or link or "click" to the sellers of business products website.

In one embodiment, the provider of process for identifying small businesses and/or small business operators 200 is the seller of business products and/or the user of process for identifying small businesses and/or small business operators 200. In this instance, in one embodiment, at PROVIDE A SELLER ACCESS TO THE GIVEN CONSUMER BASED, AT LEAST IN PART, ON THE IDENTIFICATION OF THE GIVEN CONSUMER AS A POTENTIAL BUSINESS OWNER AND/OR MANAGER OPERATION 211 the provider of process for identifying small businesses and/or small business operators 200 provides the seller, or herself, advertisement space and/or access to the small business owner and/or manager, in one embodiment, on the small business owner's and/or manager's computing system, such as computing systems 100 and/or 150 of FIG. 1.

In one embodiment, the provider of a computing system implemented financial management system, such as computing system implemented financial management systems 180 and/or 190, used to obtain the consumers financial data is the seller of business products and/or the user of process for identifying small businesses and/or small business operators. Returning to FIG. 2, in this instance, in one embodiment, PROVIDE A SELLER ACCESS TO THE GIVEN CONSUMER BASED, AT LEAST IN PART, ON THE IDENTIFICATION OF THE GIVEN CONSUMER AS A POTENTIAL BUSINESS OWNER AND/OR MANAGER OPERATION 211 the provider of the computing system implemented financial management system used to obtain the consumers financial data provides the seller, or herself, advertisement space and/or access to the small business owner and/or manager, in one embodiment, within the consumers account in the computing system implemented financial management system and, in one embodiment, on the consumer's computing system, such as computing systems 100 and/or 150 of FIG. 1, based, at least in part, on the analysis of the given consumer's financial data and the labeling of the consumer as a small business owner and/or manager by process for identifying small businesses and/or small business operators 200.

In one embodiment, once one or more sellers of business products are provided access to the consumer of IDENTIFY THE GIVEN CONSUMER AS A POTENTIAL BUSINESS OWNER AND/OR MANAGER BASED, AT LEAST IN PART, ON THE IDENTIFICATION OF THE THRESHOLD NUMBER OF BUSINESS MANAGEMENT RELATED TRANSACTIONS ASSOCIATED WITH THE GIVEN CONSUMER OPERATION 209 at PROVIDE A SELLER ACCESS TO THE GIVEN CONSUMER BASED, AT LEAST IN PART, ON THE IDENTIFICATION OF THE GIVEN CONSUMER AS A POTENTIAL BUSINESS OWNER AND/OR MANAGER OPERATION 211, process flow proceeds to exit operation 230. In one embodiment, at EXIT OPERATION 230, process for identifying small businesses and/or small business operators 200 is exited to await new data.

In the discussion above, certain aspects of one embodiment include process steps and/or operations and/or instructions described herein for illustrative purposes in a particular order and/or grouping. However, the particular order and/or grouping shown and discussed herein are illustrative only and not limiting. Those of skill in the art will recognize that other orders and/or grouping of the process steps and/or operations and/or instructions are possible and, in some embodiments, one or more of the process steps and/or operations and/or instructions discussed above can be combined and/or deleted. In addition, portions of one or more of the process steps and/or operations and/or instructions can be re-grouped as portions of one or more other of the process steps and/or operations and/or instructions discussed herein. Consequently, the particular order and/or grouping of the process steps and/or operations and/or instructions discussed herein do not limit the scope of the invention as claimed below.

Using process for identifying small businesses and/or small business operators 200, a consumer's financial transaction data is used to identify small businesses and/or small business owners. One or more sellers of business products are then given access to the consumers identified as small business owners and/or managers. This is advantageous to the sellers of business products, since the sellers of business products are provided access to these desirable consumers, and to the small business owners and/or managers, since they are provided offers directly related to their status as a business manager and/or owner.

The present invention has been described in particular detail with respect to specific possible embodiments. Those of skill in the art will appreciate that the invention may be practiced in other embodiments. For example, the nomenclature used for components, capitalization of component designations and terms, the attributes, data structures, or any other programming or structural aspect is not significant, mandatory, or limiting, and the mechanisms that implement the invention or its features can have various different names, formats, and/or protocols. Further, the system and/or functionality of the invention may be implemented via various combinations of software and hardware, as described, or entirely in hardware elements. Also, particular divisions of functionality between the various components described herein are merely exemplary, and not mandatory or significant. Consequently, functions performed by a single component may, in other embodiments, be performed by multiple components, and functions performed by multiple components may, in other embodiments, be performed by a single component.

Some portions of the above description present the features of the present invention in terms of algorithms and symbolic representations of operations, or algorithm-like representations, of operations on information/data. These algorithmic and/or algorithm-like descriptions and representations are the means used by those of skill in the art to most effectively and efficiently convey the substance of their work to others of skill in the art. These operations, while described functionally or logically, are understood to be implemented by computer programs and/or computing systems. Furthermore, it has also proven convenient at times to refer to these arrangements of operations as steps or modules or by functional names, without loss of generality.

Unless specifically stated otherwise, as would be apparent from the above discussion, it is appreciated that throughout the above description, discussions utilizing terms such as "defining", "analyzing", "obtaining", "identifying", "associating", "aggregating"; "initiating"; "collecting", "proposing", "creating", "transferring", "storing", "searching", "comparing", "providing", etc., refer to the action and processes of a computing system or similar electronic device that manipulates and operates on data represented as physical (electronic) quantities within the computing system memories, resisters, caches or other information storage, transmission or display devices.

Certain aspects of the present invention include process steps or operations and instructions described herein in an algorithmic and/or algorithmic-like form. It should be noted that the process steps and/or operations and instructions of the present invention can be embodied in software, firmware, and/or hardware, and when embodied in software, can be downloaded to reside on and be operated from different platforms used by real time network operating systems.

The present invention also relates to an apparatus or system for performing the operations described herein. This apparatus or system may be specifically constructed for the required purposes, or the apparatus or system can comprise a general purpose system selectively activated or configured/reconfigured by a computer program stored via a computer program product as defined herein that can be accessed by a computing system or other device.

Those of skill in the art will readily recognize that the algorithms and operations presented herein are not inherently related to any particular computing system, computer architecture, computer or industry standard, or any other specific apparatus. Various general purpose systems may also be used with programs in accordance with the teaching herein, or it may prove more convenient/efficient to construct more specialized apparatuses to perform the required operations described herein. The required structure for a variety of these systems will be apparent to those of skill in the art, along with equivalent variations. In addition, the present invention is not described with reference to any particular programming language and it is appreciated that a variety of programming languages may be used to implement the teachings of the present invention as described herein, and any references to a specific language or languages are provided for illustrative purposes only and for enablement of the contemplated best mode of the invention at the time of filing.

The present invention is well suited to a wide variety of computer network systems operating over numerous topologies. Within this field, the configuration and management of large networks comprise storage devices and computers that are communicatively coupled to similar and/or dissimilar computers and storage devices over a private network, a LAN, a WAN, a private network, or a public network, such as the Internet.

It should also be noted that the language used in the specification has been principally selected for readability, clarity and instructional purposes, and may not have been selected to delineate or circumscribe the inventive subject matter. Accordingly, the disclosure of the present invention is intended to be illustrative, but not limiting, of the scope of the invention, which is set forth in the claims below.

In addition, the operations shown in the FIG.s are identified using a particular nomenclature for ease of description and understanding, but other nomenclature is often used in the art to identify equivalent operations.

In the discussion above, certain aspects of one embodiment include process steps and/or operations and/or instructions described herein for illustrative purposes in a particular order and/or grouping. However, the particular order and/or grouping shown and discussed herein are illustrative only and not limiting. Those of skill in the art will recognize that other orders and/or grouping of the process steps and/or operations and/or instructions are possible and, in some embodiments, one or more of the process steps and/or operations and/or instructions discussed above can be combined and/or deleted. In addition, portions of one or more of the process steps and/or operations and/or instructions can be re-grouped as portions of one or more other of the process steps and/or operations and/or instructions discussed herein. Consequently, the particular order and/or grouping of the process steps and/or operations and/or instructions discussed herein do not limit the scope of the invention as claimed below.

Therefore, numerous variations, whether explicitly provided for by the specification or implied by the specification or not, may be implemented by one of skill in the art in view of this disclosure.

What is claimed is:

1. A system for identifying small businesses and/or small business operators comprising:
    a processor; and
    a memory coupled to the processor, the memory having processor executable instructions stored therein, which when executed by the processor, perform a process for identifying small businesses and/or small business operators comprising:
    defining a threshold number of business management related transactions such that if the threshold number of business management related transactions are identified and are of a given consumer, the given consumer is identified as a potential business owner and/or manager;
    obtaining a given consumer's financial data, the given consumers financial data comprising data representing one or more individual financial transactions performed by the given consumer;
    analyzing at least part of the data representing one or more individual financial transactions of the given consumer to identify individual financial transactions of the given consumer that are business management related transactions of the given consumer, the analyzing comprising:
        identifying a community of peers,
        categorizing individual financial transactions of the given consumer as business related financial transactions, the categorization being based on what category is assigned, by a majority of consumers in the community of peers, to similar financial transactions; and
        identifying the given individual financial transaction of the one or more individual financial transactions of the given consumer categorized as a business related financial transaction as a business management related transaction of the given consumer;
    identifying at least the threshold number of the individual financial transactions of the given consumer as business management related transactions of the given consumer; and
    identifying the given consumer as a potential business owner and/or manager based, at least in part, on having identified the at least threshold number of individual financial transactions of the given consumer as being business management related transactions of the given consumer.

2. The system for identifying small businesses and/or small business operators of claim 1, wherein;
    the threshold number of business management related transactions is one.

3. The system for identifying small businesses and/or small business operators of claim 1, wherein;
    the threshold number of business management related transactions is two or more.

4. The system for identifying small businesses and/or small business operators of claim 1, wherein;
    at least part of the given consumer's financial data is obtained from a computing system implemented financial management system.

5. The system for identifying small businesses and/or small business operators of claim 1, wherein;
    the computing system implemented financial management system is a computing system implemented personal financial management system.

6. The system for identifying small businesses and/or small business operators of claim 1, wherein;
    at least part of the given consumer's financial data is obtained from one or more of the sources of financial data selected from the group of sources of financial data consisting of:
    a bank;
    a debit card account;
    a credit union;
    an investment account;
    a loan account; or
    a credit card account.

7. The system for identifying small businesses and/or small business operators of claim 1, wherein;
    at least part of the given consumer's financial data is obtained from two or more sources of financial data selected from the group of sources of financial data consisting of:
    a bank;
    a debit card account;
    a credit union;
    an investment account;
    a loan account; or
    a credit card account.

8. The system for identifying small businesses and/or small business operators of claim 1, wherein;
    analyzing at least part of the data representing one or more individual financial transactions of the given consumer to identify individual financial transactions of the given consumer that are business management related transactions of the given consumer comprises:
    the consumer categorizing, or approving the categorization of, one or more individual financial transactions as business related financial transactions; and
    identifying the one or more individual financial transactions categorized as business related financial transactions as business management related transactions of the given consumer.

9. The system for identifying small businesses and/or small business operators of claim 1, wherein;
    analyzing at least part of the data representing one or more individual financial transactions of the given consumer to identify individual financial transactions of the given consumer that are business management related transactions of the given consumer comprises:
    categorizing a given individual financial transaction of the one or more individual financial transactions of the given consumer as a business related financial transaction based, at least in part, on a payee name of the given individual financial transaction of the one or more individual financial transactions of the given consumer; and
    identifying the given individual financial transaction of the one or more individual financial transactions of the given consumer categorized as a business related financial transaction as a business management related transaction of the given consumer.

10. The system for identifying small businesses and/or small business operators of claim 1, wherein;
    analyzing at least part of the data representing one or more individual financial transactions of the given consumer to identify individual financial transactions of the given consumer that are business management related transactions of the given consumer comprises:
    categorizing a given individual financial transaction of the one or more individual financial transactions of the given consumer as a business related financial transaction based, at least in part, on a keyword in a payee name of the given individual financial transaction of the one or more individual financial transactions of the given consumer; and
    identifying the given individual financial transaction of the one or more individual financial transactions of the given consumer categorized as a business related financial transaction as a business management related transaction of the given consumer.

11. The system for identifying small businesses and/or small business operators of claim 1, wherein;
    analyzing at least part of the data representing one or more individual financial transactions of the given consumer to identify individual financial transactions of the given consumer that are business management related transactions of the given consumer comprises:
    defining a threshold number of deposits to a financial institution in a given period of time such that if more than the threshold number of individual financial transactions of the one or more individual financial transactions of the given consumer are deposits to a financial institution in a given period of time, the threshold number of individual financial transactions of the one or more individual financial transactions of the given consumer that are deposits to a financial institution are categorized as business related financial transactions; and
    identifying the threshold number of individual financial transactions of the one or more individual financial transactions of the given consumer categorized as business related financial transactions as a business management related transactions of the given consumer.

12. The system for identifying small businesses and/or small business operators of claim 1, wherein;
    analyzing at least part of the data representing one or more individual financial transactions of the given consumer to identify individual financial transactions of the given consumer that are business management related transactions of the given consumer comprises:
    categorizing a given individual financial transaction of the one or more individual financial transactions of the given consumer as a business related financial transaction based, at least in part, on a threshold amount being of the given individual financial transaction of the one or more individual financial transactions of the given consumer; and
    identifying the given individual financial transaction of the one or more individual financial transactions of the given consumer categorized as a business related financial transaction as a business management related transaction of the given consumer.

13. The system for identifying small businesses and/or small business operators of claim 1, wherein;
    analyzing at least part of the data representing one or more individual financial transactions of the given consumer to identify individual financial transactions of the given consumer that are business management related transactions of the given consumer comprises:
    categorizing a given individual financial transaction of the one or more individual financial transactions of the given consumer as a business related financial transaction based, at least in part, on dates of the given individual financial transaction of the one or more individual financial transactions of the given consumer; and
    identifying the given individual financial transaction of the one or more individual financial transactions of the given consumer categorized as a business related financial transaction as a business management related transaction of the given consumer.

14. The system for identifying small businesses and/or small business operators of claim 1, wherein;
    analyzing at least part of the data representing one or more individual financial transactions of the given consumer to identify individual financial transactions of the given consumer that are business management related transactions of the given consumer comprises:
    categorizing a given individual financial transaction of the one or more individual financial transactions of the given consumer as a business related financial transaction based, at least in part, on locations of the given individual financial transaction of the one or more individual financial transactions of the given consumer; and
    identifying the given individual financial transaction of the one or more individual financial transactions of the given consumer categorized as a business related financial transaction as a business management related transaction of the given consumer.

15. The system for identifying small businesses and/or small business operators of claim 1, wherein;
    analyzing at least part of the data representing one or more individual financial transactions of the given consumer to identify individual financial transactions of the given consumer that are business management related transactions of the given consumer comprises:
    categorizing a given individual financial transaction of the one or more individual financial transactions of the given consumer as a business related financial transaction based, at least in part, on items purchased through the given individual financial transaction of the one or more individual financial transactions of the given consumer; and
    identifying the given individual financial transaction of the one or more individual financial transactions of the given consumer categorized as a business related financial transaction as a business management related transaction of the given consumer.

16. The system for identifying small businesses and/or small business operators of claim 1, further comprising:
 providing a seller of business products access to the given consumer based, at least in part, on the identification of the given consumer as a potential business owner and/or manager.

17. The system for identifying small businesses and/or small business operators of claim 16, wherein;
 providing a seller of business products access to the given consumer based, at least in part, on the identification of the given consumer as a potential business owner and/or manager comprises providing the seller of business products advertisement space.

18. The system for identifying small businesses and/or small business operators of claim 17, wherein;
 providing the seller of business products advertisement space comprises providing the seller of business products advertisement space in one of the following venues:
 a website on a network;
 a network search engine site;
 a computing system implemented application;
 a database.

19. A system for identifying small businesses and/or small business operators comprising:
 a processor; and
 a memory coupled to the processor, the memory having processor executable instructions stored therein, which when executed by the processor, perform a process for identifying small businesses and/or small business operators comprising:
 defining a threshold number of business management related transactions such that if the threshold number of business management related transactions are identified and are of a given consumer, the given consumer is identified as a potential business owner and/or manager, a business management related transaction being a transaction typically of ownership or management of a business;
 obtaining a given consumer's banking financial data, the given consumer's banking financial data comprising one or more individual financial transactions performed by the given consumer;
 analyzing the one or more individual financial transactions to identify individual financial transactions that are business management related transactions, the analysis comprising:
 identifying a community of peers;
 categorizing individual financial transactions of the given consumer as business related financial transactions, the categorization being based on what category is assigned, by a majority of consumers in the community of peers, to similar financial transactions;
 identifying the given individual financial transaction of the one or more individual financial transactions of the given consumer categorized as a business related financial transaction as a business management related transaction of the given consumer;
 and one or more of
 comparing the payees of the one or more financial transactions to a predetermined list of keywords of business management transactions, the presence of one or more of the keywords indicating that the particular transaction being analyzed is a business management transaction,
 comparing the payee names of the one or more transactions to a list of payee names and assumed categorizations, with a match being indicative of the presence of a business management transaction,
 determining whether a threshold number of financial transactions within a given timeframe are deposits to one or more financial institutions, thus indicating that the consumer is a business management consumer,
 determining whether a threshold number of financial transactions within a given timeframe are deposits with a threshold number of different financial institutions, thus indicating that the consumer is a business management consumer;
 identifying at least the threshold number of the individual financial transactions of the given consumer as business management related transactions of the given consumer; and
 identifying the given consumer as a potential business owner and/or manager based, at least in part, on the analysis and potentially having identified at least a threshold number of individual financial transactions of the given consumer as being business management related transactions;
 providing access to the identified potential owner or manager by sellers of business products.

\* \* \* \* \*